United States Patent [19]

Wolfe, Jr.

[11] Patent Number: 4,710,544

[45] Date of Patent: Dec. 1, 1987

[54] THERMOPLASTIC COMPOSITION OF POLYOLEFIN AND HIGH ETHYLENE CONTENT ETHYLENE/ALKYL ACRYLATE ELASTOMER

[75] Inventor: James R. Wolfe, Jr., Wilmington, Del.

[73] Assignee: E. I. Du Pont de Nemours and Company, Wilmington, Del.

[21] Appl. No.: 17,332

[22] Filed: Feb. 20, 1987

Related U.S. Application Data

[63] Continuation-in-part of Ser. No. 796,589, Nov. 7, 1985.

[51] Int. Cl.⁴ .................. C08L 23/26; C08L 23/36; C08L 23/04; C08L 23/10
[52] U.S. Cl. .................. 525/194; 525/207; 525/221; 525/227; 524/522; 524/523
[58] Field of Search ................ 525/221, 194

[56] References Cited

U.S. PATENT DOCUMENTS

| | | | |
|---|---|---|---|
| 2,953,541 | 9/1960 | Pecha | 525/227 |
| 3,904,588 | 9/1975 | Greene | 260/78.5 R |
| 4,234,656 | 11/1980 | Amembal | 428/379 |
| 4,275,180 | 6/1981 | Clarke | 525/173 |
| 4,555,546 | 11/1985 | Patel | 525/194 |

*Primary Examiner*—Carman J. Seccuro

[57] ABSTRACT

A melt processible thermoplastic composition comprising a blend of:
(A) 15–75 parts by weight of a crystalline polyolefin resin comprising polymerized monomer units of ethylene or propylene or mixtures thereof, and
(B) 25–80 parts by weight of a crosslinked ethylene/alkyl acrylate elastomer made from dynamically crosslinking an ethylene/alkyl acrylate/monoalkyl ester of 1,4-butenedioic acid copolymer containing about 60–90 weight percent ethylene and wherein the alkyl group of the alkyl acrylate contains 1–6 carbon atoms, the dynamically crosslinked elastomer being dispersed throughout the crystalline polyolefin resin.

26 Claims, No Drawings

THERMOPLASTIC COMPOSITION OF POLYOLEFIN AND HIGH ETHYLENE CONTENT ETHYLENE/ALKYL ACRYLATE ELASTOMER

CROSS-REFERENCE TO RELATED APPLICATION

This application is a continuation-in-part of application Ser. No. 796,589, filed Nov. 7, 1985.

BACKGROUND OF THE INVENTION

Nonpolar olefin polymers, e.g., polypropylene resin, and polar acrylate ester copolymers, e.g., ethylene/alkyl acrylate elastomers, when blended do not form mixtures that have adequate physical properties required for many commercial uses. The low degree of compatibility of the polymers with each other is evident from the lack of development in the blends of good physical properties, especially tensile strength and elongation at break and, consequently, such blends cannot be used for many applications such as tubing, seals, hose covers, and wire and cable coverings when high tensile strength and elongation at break are required. In order to obtain optimum physical properties when an alkyl acrylate elastomer and a polyolefin resin are blended, as disclosed in U.S. Pat. No. 4,555,546, it has been necessary to add a compatibilizing agent to the polymer mixture.

The compatibilizing agents for polyolefins, e.g., polypropylene, and ethylene/alkyl acrylate elastomers, e.g., ethylene/methyl acrylate/cure site monomer, are copolymers that have at least one olefin polymer compatibilizing segment derived from a homopolymer or copolymer of a $C_2$-$C_8$ alpha-monoolefin or polybutadiene, polyisoprene or a polyalkenamer, and at least one acrylic ester copolymer rubber compatibilizing segment derived from a polymer selected from epichlorohydrin polymers, nitrile rubber, urethane polymers, vinyl chloride polymers, polyamides, polyamines, polyesters, and crosslinkable acrylic ester copolymer rubbers. The requirement that the blend of polymers must contain a compatibilizing agent to make a product having excellent physical properties adds to the expense of the polymer blend and requires an extra step for manufacturing the thermoplastic composition.

It has now been discovered that blends of certain nonpolar crystalline polyolefin resins, e.g., polypropylene, and dynamically crosslinked elastomer polar polymers which comprise ethylene, an alkyl acrylate, and a cure site can be prepared that have excellent tensile strength values and elongation at break values without the necessity of incorporating into the thermoplastic composition a compatibilizing agent. These thermoplastic compositions are especially useful for molding parts such as seals, gaskets, and sheeting for automotive applications, e.g., doors or fenders, and wire and cable covering.

SUMMARY OF THE INVENTION

The present invention is directed to a thermoplastic composition having excellent tensile strength and elongation at break values. More specifically, this invention is directed to a melt processible thermoplastic composition comprising a blend of:

(A) 15–75 parts by weight of a crystalline polyolefin resin comprising polymerized monomer units of ethylene or propylene or mixtures thereof, and (B) 25–85 parts by weight of a crosslinked ethylene/alkyl acrylate elastomer made from dynamically crosslinking an ethylene/alkyl acrylate/monoalkyl ester of 1,4-butenedioic acid copolymer containing about 60–90 weight percent ethylene, preferably 65–80 weight percent, and wherein the alkyl group of the alkyl acrylate contains 1–6 carbon atoms, the dynamically crosslinked elastomer being dispersed throughout the crystalline polyolefin resin.

The melt processible multi-phase thermoplastic composition comprising a blend of a crystalline polyolefin resin and a dynamically crosslinked elastomer can be prepared by mixing and shearing an uncrosslinked elastomeric ethylene, alkyl acrylate copolymer containing a cure site monomer, i.e., the monoalkyl ester of 1,4-butenedioic acid, with a crystalline polyolefin resin and a crosslinking agent for the elastomer, preferably in a high shear mixer, and carrying out crosslinking of the ethylene, alkyl acrylate copolymer having a cure site and containing about 60–90 weight percent ethylene simultaneously with the mixing operation. In order for the compositions to process well as thermoplastics, the dynamically crosslinked ethylene, alkyl acrylate elastomer component must contain at least 60 weight percent ethylene, otherwise the composition will have inadequate tensile strength and inadequate elongation at break values, which indicate that the polymer components of the composition are not compatible and their use is restricted.

More specifically, a preferred process for making a melt processible thermoplastic composition comprising a blend of a crystalline polyolefin resin and a dynamically crosslinked elastomer comprises:

(1) adding to a mixer (A) 15–75 parts by weight of the crystalline polyolefin resin, polyethylene, polypropylene or copolymers thereof, (B) 25–85 parts by weight of an uncrosslinked elastomer comprising 60–90 weight percent ethylene, preferably 65–80 weight percent ethylene, an alkyl acrylate wherein the alkyl group contains 1–6 carbon atoms and the monoalkyl ester of 1,4-butenedioic acid, (C) a crosslinking agent for the ethylene, alkyl acrylate elastomer, and (2) mixing and shearing the composition at a temperature sufficient to soften the polyolefin resin and to dynamically crosslink said elastomer resulting in the crosslinked elastomer being dispersed throughout the crystalline polyolefin resin.

The melt processible multi-phase thermoplastic compositions can be formed into various shapes by compression molding, injection molding, blow molding and extrusion procedure. The compositions can be used for automotive parts, e.g., automotive boots, seals, gaskets, tubing, reinforced hose, film, sheeting, and wire cable coverings and show high tensile strength and elongation at break values in spite of the fact the composition does not contain a compatibilizing agent.

DESCRIPTION OF PREFERRED EMBODIMENTS

The crystalline polyolefin resin used in the present invention is polyethylene, polypropylene or copolymers thereof and is added to and is present in the composition in amounts of from about 15–75 parts by weight, preferably, 25–70 parts by weight. The terms "polyethylene" and "polypropylene" as used herein are intended to include, in addition to the homopolymers, those polymers that also contain minor amounts, usually not greater than 15 weight percent, of higher alpha-olefins, e.g., those containing 3–8 carbon atoms, e.g., butene, octene etc. The polyethylene and the polypropylene polymers used in this invention have melt indices in the range of from about 0.07–80 dg/min. Polypropylene is the preferred resin because of the superior properties it imparts to the composition, especially improved heat resistance.

The melt processible thermoplastic compositions also contain 25–85 parts by weight, preferably 30–75 parts by weight, of a dynamically crosslinked elastomer which comprises ethylene, an alkyl acrylate wherein the alkyl group contains 1–6 carbon atoms. The elastomer is made from dynamically crosslinking an ethylene/alkyl acrylate/monoalkyl ester of 1,4-butenedioic acid copolymer, the latter monomer of the elastomer functioning as a cure site. Quite surprisingly, the polyolefin and the dynamically crosslinked ethylene/alkyl acrylate elastomer are compatible provided that the amount of ethylene in the elastomeric copolymer is at least about 60 weight percent, preferably at least about 65 weight percent. The excellent compatibility of the blends of the thermoplastic compositions, without the necessity of incorporating a compatibilizing agent for the nonpolar polyolefin and the polar elastomeric copolymer, is shown by the the high tensile strength values and high elongation at break values obtained. The dynamically crosslinked ethylene/alkyl acrylate elastomer component of the blend usually does not contain more than about 90 weight percent of ethylene, preferably not more than about 80 weight percent ethylene. Although compatibility of the polymers constituting the thermoplastic blend is not adversely affected with ethylene contents as high as 85–90 weight percent, the oil swell of the blend increases and for many uses, especially under-the-hood automotive applications, a high oil swell is detrimental and, therefore, for such applications the ethylene content of the dynamically crosslinked elastomer is not greater than 80 weight percent. The elastomer comprises units of ethylene and units of an alkyl acrylate wherein the alkyl group contains 1–6 carbon atoms. The ethylene/alkyl acrylate copolymer contains 5–40 weight percent alkyl acrylate units, preferably 15–35 weight percent. The alkyl acrylates used in the ethylene/alkyl acrylate copolymers include methyl acrylate, ethyl acrylate, propyl acrylate, butyl acrylate, pentyl acrylate and hexyl acrylate. Preferably, methyl acrylate is used. The uncrosslinked elastomer contains as a cure site the monoalkyl esters of 1,4-butenedioic acid that reacts with the amine curing agent. Preferably, the cure site monomers in the ethylene/alkyl acrylate elastomers are monoalkyl esters of 1,4-butenedioic acid in which the alkyl group generally contains 1–6 carbon atoms. Since butenedioic acids exist in the cis and trans form, i.e., maleic and fumaric acids, the monoalkyl esters of either the cis or trans form are satisfactory. Representative monoalkyl esters of 1,4-butenedioic acid that are especially preferred are monoethyl hydrogen maleate, monoethyl hydrogen fumarate, monomethyl hydrogen maleate, monomethyl hydrogen fumarate, and monopropyl hydrogen maleate, and monoethyl hydrogen maleate is most especially preferred.

The dynamically crosslinked ethylene/alkyl acrylate elastomers used in the compositions of the present invention can be prepared by direct copolymerization, for example, copolymerizing ethylene, an alkyl acrylate, and as a cure site the monoalkyl ester of 1,4-butenedioic acid, in the presence of a free-radical polymerization initiator at elevated temperatures, preferably 100°–270° C., and most preferably 130°–230° C., and at elevated pressures, preferably at least 70 MPa, and most preferably 140–350 MPa. The most preferred uncured ethylene/alkyl acrylates/monoalkyl ester of 1,4-butenedioic acid copolymers that are used to make the dynamically crosslinked elastomeric component of the thermoplastic blends of the present invention are copolymers of ethylene/methyl acrylate/monoethyl hydrogen maleate. Representative elastomers that can be dynamically crosslinked for use in this invention are described, for example, in U.S. Pat. No. 3,904,588.

An important feature of the present invention is the necessity of dynamically crosslinking the high ethylene containing elastomeric ethylene, alkyl acrylate/monoalkyl ester of 1,4-butenedioic acid copolymer, usually, and most preferably, in the presence of the polyolefin resin. Dynamic crosslinking is carried out using one or more of the well known crosslinking agents for the ethylene/alkyl acrylate/monoalkyl esters of 1,4-butenedioic acid copolymers. Typical crosslinking agents that react with the cure sites of the ethylene, alkyl acrylate copolymers described herein include diamines or polyamines or precursors thereof such as methylenedianiline; 1,6-hexanediamine or its carbamate; meta-xylene-alpha,alpha′-diamine; 2-methyl-1,5-diamino-pentane; triethylenetetramine; diethylenetriamine; bis(para-aminocyclohexyl)methane; and ethylene diamine. The amount of crosslinking agent employed will vary over a wide range. Usually the amount of crosslinking agent used will result in a gel content of the dynamically crosslinked ethylene, alkyl acrylate copolymer of at least about 50 percent by weight. Typically, such amounts of crosslinking agents range from about 0.1–5 parts by weight, usually 0.1–2 parts by weight, of the ethylene, alkyl acrylate elastomer containing cure sites. Although the amount of crosslinking agent used can be more than 5 parts by weight, there is no advantage in using larger amounts. As is the usual practice when crosslinking (curing) elastomeric ethylene, alkyl acrylate copolymers, containing cure sites, optionally conventional promotors such as di-ortho-tolylguanidine, diphenylguanidine or the like can be used. To quantify the degree of crosslinking the amount of insoluble, and hence crosslinked polymer is determined by leaching the sample of the crosslinked polymer at a temperature at which the polymer before crosslinking will dissolve in toluene, in the same toluene solvent for 48 hours, isolating the insoluble portion and weighing the dried polymer, making suitable corrections based upon knowledge of the composition. For example, the weight of additives soluble in toluene such as processing oils are subtracted from the initial weight. The weight of insoluble additives such as pigments, fillers etc., are subtracted from the initial and final weight. The portion of the crystalline polyolefin resin which is insoluble in toluene is subtracted from the initial and final weight. The insoluble polymer recovered after the required correction is reported as percent by weight gel content. The dynamically crosslinked elastomers of ethylene/alkyl acrylate usually have gel contents of at least about 50 percent by weight, preferably at least about 65 percent by weight. Conditions under which crosslinking is carried out, i.e., type and quantity of crosslinking agent, and crosslinking time and temperature, to arrive at a polymer having a gel content mentioned above can be determined empirically and is well known in the art of making crosslinked ethylene/alkyl acrylate elastomers.

The multi-phase melt processible thermoplastic composition is prepared by mixing the crystalline polyolefin resin, the uncrosslinked ethylene/alkyl acrylate/-monoalkyl ester of 1,4-butenedioic acid elastomer containing at least about 60 weight percent ethylene, preferably at least about 65 weight percent ethylene, and crosslinking agent, by any one of a number of well known procedures for mixing elastomers, for example, in a Banbury mixer, or in an extruder. The mixing is performed at a temperature high enough to soften the polymers for adequate mixing, but not so high as to degrade the polymers. Generally, mixing is performed at temperatures of from about 100°–280° C., usually about 125°–230° C. Crosslinking is conducted during mixing and shearing so as to dynamically crosslink the ethylene/alkyl acrylate copolymer containing cure sites. Mixing and shearing are carried out for a time sufficient to allow for dynamically crosslinking the ethylene/alkyl acrylate elastomer and for comminuting the crosslinked elastomer resulting in the elastomer being dispersed throughout the crystalline polyolefin resin. Adequacy of mixing can be determined by observing the processibility of the compositions by means of a piston rheometer. If the degree of mixing is inadequate, as indicated by poor extrudability at processing temperatures, additional mixing at the original mixing temperature or at lower temperatures can be employed to further comminute and disperse the resultant dynamically crosslinked ethylene/alkyl acrylate elastomer in the crystalline polyolefin resin so as to obtain satisfactory thermoplastic processibility.

Although fillers and compounding ingredients are not essential components of the thermoplastic composition of this invention, preferably, especially from a cost standpoint, various amounts of conventional fillers and/or compounding ingredients normally used with elastomers are admixed with the compositions of this invention. Examples of such ingredients include extending oils, e.g., aromatic oils, paraffinic oils or naphthenic oils; inorganic fillers, such as various carbon blacks, clays, silica, alumina, calcium carbonate; pigments, such as titanium dioxide; antioxidants; antidegradants; processing aids such as lubricants and waxes; and plasticizers such as dialkylphthalates, trialkylmellitates and dialkyladipates. It is preferable to add processing oils and/or plasticizers and inorganic fillers to the thermoplastic composition to improve its processing characteristics and the particular amounts used depend, at least in part, upon the quantities of other ingredients in the composition and the desired properties of the composition. Generally, amounts from about 5–50 parts by weight based on total polymers of fillers can be used and 10–100 parts by weight based on total weight of polymers of compounding ingredients such as processing oils and plasticizers can be used.

The melt processible thermoplastic compositions of the subject invention can be processed using conventional plastic processing equipment. Articles molded from the thermoplastic compositions of the present invention exhibit properties generally only associated with vulcanized rubber. For example, compositions of the present invention usually have tensile strength values of about 10–25 MPa and elongation at break values of about 100 to 350%. Various uses for the thermoplastic elastomer compositions include wire coverings, seals and gaskets, automotive parts, sheet liners and packaging films. Further, melt processible thermoplastic compositions within the scope of this invention can be fabricated into tubing for laboratory, medical and industrial uses. Such tubing can also be used as the inner tube of reinforced hoses, wherein the extruded tube is overlaid with wire or textile cords, applied as a spiral, knit or braid. Optionally, a polymeric covering can be applied (extruded, spiral wound or calendered sheet) over the reinforced tubing to provide protection from the working environment and mechanical abuse. Compositions within the scope of this invention can be used as the protective covering of reinforced tubes of similar or different composition.

EXAMPLES

General Procedure Used to Prepare Thermoplastic Compositions

The polymers to be mixed were charged to a Brabender Plastograph mixer equipped with cam-style blades and modified to allow a flow of nitrogen gas to blanket the mixing chamber. Before charging the polymers, the mixing chamber was preheated to the mixing temperatures given in the examples. The initial polymer composition for each example described below was mixed in the Brabender mixer until the temperature of the mixing chamber recovered to the preheat temperature. Mixing times given in the working examples were measured from that time forward. During preparation of the thermoplastic compositions, the temperature of the mixtures usually rose above the preset temperature of the mixing chamber. Specific details of the mixing procedures are described in the examples.

Polymer Test Methods

Test specimens were cut from slabs molded at the temperatures specified in the examples to determine physical properties. The test methods used were:

| | |
|---|---|
| tensile strength at break at 8.5 mm/s | ASTM D412 |
| elongation at break at 8.5 mm/s | ASTM D412 |
| compression set after 22 hr/100° C., method B | ASTM D395 |
| volume swell in ASTM #3 oil | ASTM D471 |

Stress-strain measurements were run on test specimens approximately 1.9 mm thick. Stress-strain measurements were run using nonstandard dumbbells having the following dimensions using the standard dumbbell nomenclature of ASTM D412:

A=13 mm, C=83 mm, L=44 mm, W=6.4 mm

Compression sets were measured using 13 mm diameter discs died out of about 1.9 mm thick slabs and piled up to a thickness of about 13 mm. Specimens used for the oil swell tests were cut from 1.9 mm thick slabs. All tests were run in duplicate or triplicate.

Polymer Employed

The polypropylene employed in the working examples hereinbelow is an isotactic homopolymer having a melt flow rate (ASTM D1238) at 230° C. of 0.8 dg/min and a density of 0.9 g/cm$^3$.

The polyethylene employed in the working examples hereinbelow is a high density polyethylene having a melt flow rate at 190° C. of 2.8 dg/min and a density of 0.96 g/cm³.

The ethylene/alkyl acrylate elastomer employed contains ethylene, methyl acrylate, and the monoethyl hydrogen maleate. The ratio of ethylene to methyl acrylate was varied, as shown below in the tables.

The following specific examples, in which parts are by weight unless otherwise indicated, are illustrative of the present invention and show the advantages resulting therefrom.

Examples 1-3

A series of thermoplastic compositions described below in Table I were prepared from polypropylene homopolymer resin and the uncrosslinked elastomer of ethylene/methyl acrylate/cure site monomer in which the ratio of ethylene to methyl acrylate was varied as indicated below. The compositions were prepared by mixing 55 parts by weight polypropylene in the Brabender mixer for two minutes. When the temperature reached 180° C., 45 parts by weight elastomeric ethylene/methyl acrylate/cure site copolymer were added and mixing was continued for three minutes. Then 0.9 parts by weight of the crosslinking agent triethylenetetramine per 100 parts of total polymer were added and mixing and shearing was continued for 10 minutes to dynamically crosslink (i.e., cure) the elastomer. The resulting thermoplastic composition was removed from the Brabender mixer, and sheeted off a roll mill at 170° C. The relative proportions of the polymer components, the composition of the ethylene/methyl acrylate cure site elastomer, the tensile strength and percent elongation of the thermoplastic compositions after compression molding at 220° C. are given below in Table I.

TABLE I

|  | 1 | 2 | 3 | Comp. Ex. A |
|---|---|---|---|---|
| Polypropylene | 55 | 55 | 55 | 55 |
| 64% E/32% MA/ 4% MAME | 45 | — | — | — |
| 69% E/27% MA/ 4% MAME | — | 45 | — | — |
| 79% E/17% MA/ 4% MAME | — | — | 45 | — |
| 41% E/55% MA/ 4% MAME | — | — | — | 45 |
| Triethylene tetramine | 0.9 | 0.9 | 0.9 | 0.9 |
| Properties |  |  |  |  |
| Tensile Strength, MPa | 25.0 | 25.2 | 23.6 | 14.5 |
| Elongation at break, % | 380 | 430 | 340 | 130 |

E/MA/MAME - ethylene, methyl acrylate, monoethyl hydrogen maleate.

Examples 1 to 3 are illustrative of the present invention illustrating the compatibility of the blends as shown by their high tensile strength and elongation at break. Comparative Example A illustrates that the blend with 41 weight percent ethylene units in the ethylene/methyl acrylate/cure site elastomer is not compatible and shows poor tensile strength and poor elongation at break values.

EXAMPLES 4-6

A series of thermoplastic compositions were prepared as described in Table II using polypropylene homopolymer resin, ethylene/methyl acrylate elastomer, calcined clay, paraffinic oil, and a plasticizer in the amounts indicated. The thermoplastic compositions were prepared by mixing the polypropylene in the Brabender mixer for two minutes. After the temperature reached 180° C., ethylene/methyl acrylate/cure site elastomer was added and mixing was continued for three minutes. The clay, paraffinic oil, and plasticizer were added slowly and the composition was mixed for an additional two minutes. The crosslinking agent triethylenetetramine was added and mixing and shearing of the composition was continued for 10 minutes to dynamically crosslink (i.e., cure) the elastomer. The resulting thermoplastic compositions were removed from the Brabender mixer and sheeted off a roll mill at 170° C.

The relative proportions of the polymer components, the composition of the ethylene/methyl acrylate/cure site elastomer and the tensile strength of the thermoplastic compositions after compression molding at 220° C. are listed given in Table II.

TABLE II

|  | 4 | 5 | 6 | Comparative Examples C | D |
|---|---|---|---|---|---|
| Polypropylene | 55 | 55 | 55 | 55 | 55 |
| 64% E/32% MA/ 4% MAME | 45 | — | — | — | — |
| 69% E/27% MA/ 4% MAME | — | 45 | — | — | — |
| 79% E/17% MA/ 4% MAME | — | — | 45 | — | — |
| 41% E/55% MA/ 4% MAME | — | — | — | 45 | — |
| 54% E/42% MA/ 4% MAME | — | — | — | — | 45 |
| Calcined Clay | 20 | 20 | 20 | 20 | 20 |
| Paraffinic Extender Oil | 20 | 20 | 20 | 20 | 20 |
| Di(tridecyl)-adipate plasticizer | 20 | 20 | 20 | 20 | 20 |
| Triethylene-tetramine | 0.9 | 0.9 | 0.9 | 0.9 | 0.9 |
| Properties |  |  |  |  |  |
| Tensile Strength, MPa | 11.4 | 11.7 | 12.3 | 5.7 | 7.3 |
| Elongation at break, % | 210 | 260 | 240 | 40 | 70 |
| Comp. set at 100° C., % | 64 | 63 | 55 | 64 | 63 |
| Oil swell, 70 hrs. at 100° C., % | 38 | 45 | 47 | — | 23 |

E/MA/MAME — ethylene/methyl acrylate/monoethyl hydrogen maleate.

The results shown in these examples also demonstrates that the invention can be carried out in the presence of fillers, oils and plasticizers and the resulting blends of polymers are compatible, as shown by the high tensile strength values and elongation at break values obtained.

EXAMPLE 7

The thermoplastic compositions described below in Table III were prepared as described above in Examples 1-3, and compression molded at 220° C. as described in Examples 1-3, except that the polypropylene homopolymer was replaced with high density polyethylene. The thermoplastic compositions were compression molded at 220° C. as described in Examples 1-3.

TABLE III

|  | 7 | Comparative Example E |
|---|---|---|
| Polyethylene | 55 | 55 |
| 64% E/32% MA/4% MAME | 45 | |
| 41% E/55% MA/4% MAME | | 45 |
| Triethylenetetramine | 0.9 | 0.9 |
| Properties | | |
| Tensile strength, MPa | 19.5 | 13.4 |
| Elongation at break, % | 370 | 155 |

E/MA/MAME — ethylene/methyl acrylate/monoethyl hydrogen maleate.

Example 7 illustrates the compatibility of the blend as shown by its high tensile strength value and elongation at break value. Comparative Example E illustrates that the thermoplastic composition with only 41 weight percent ethylene units in the ethylene/methyl acrylate/cure site elastomer is less compatible with the polyethylene and has a poor tensile strength value and a poor $E_B$ value.

EXAMPLES 8-11

A series of thermoplastic compositions described below in Table IV were prepared as described above in Examples 1-3 but with the ratio of polyolefin resin to elastomer being varied. The properties of the thermoplastic composition after compression molding at 220° C. are given below in Table IV.

TABLE IV

|  | 8 | 9 | 10 | 11 |
|---|---|---|---|---|
| polypropylene, parts by weight | 25 | — | 65 | — |
| polyethylene, parts by weight | — | 25 | — | 65 |
| 64% ethylene/32% methyl acrylate/4% MAME* elastomer, parts by weight | 75 | 75 | 35 | 35 |
| triethylenetetramine, parts by weight | 0.5 | 0.5 | 1.3 | 1.3 |
| Tensile Properties | | | | |
| Tensile strength, MPa | 22.9 | 15.2 | 21.0 | 18.3 |
| Elongation at break, % | 550 | 320 | 305 | 285 |

*MAME — monoethyl hydrogen maleate.

The results of Examples 8-11 demonstrate that the invention can be carried out at both high and low polyolefin concentrations, and the resulting blends are compatible as shown by their high tensile strength values and elongation at break values.

I claim:

1. A melt processable thermoplastic composition comprising a blend of:
   (A) 15-75 parts by weight of a crystalline polyolefin resin comprising polymerized monomer units of ethylene or propylene or mixtures thereof, and
   (B) 25-85 parts by weight of a crosslinked ethylene-/alkyl acrylate elastomer made from dynamically crosslinking an ethylene/alkyl acrylate/monoalkyl ester of 1,4-butenedioic acid copolymer containing about 60-90 weight percent ethylene and wherein the alkyl group of the alkyl acrylate contains 1-6 carbon atoms, the dynamically crosslinked elastomer being dispersed throughout the crystalline polyolefin resin.

2. A melt processable thermoplastic composition of claim 1 wherein the dynamically crosslinked elastomer contains from about 65-80 weight percent ethylene.

3. A melt processable thermoplastic composition of claim 1 wherein the alkyl acrylate of the dynamically crosslinked elastomer is methyl acrylate.

4. A melt processable thermoplastic composition of claim 3 wherein the monoalkyl ester of 1,4-butenedioic acid of the dynamically crosslinked elastomer is monoethyl hydrogen maleate.

5. A melt processable thermoplastic composition of claim 1 wherein the crystalline polyolefin resin comprises polymerized monomer units of ethylene.

6. A melt processable thermoplastic composition of claim 1 wherein the crystalline polyolefin resin comprises polymerized monomer units of propylene.

7. A melt processable thermoplastic composition of claim 4 wherein the crystalline polyolefin resin comprises polymerized monomer units of propylene.

8. A melt processable thermoplastic composition of claim 1 wherein the polyolefin resin comprises polymerized monomer units of propylene and the dynamically crosslinked elastomer comprises ethylene, methyl acrylate and monoethyl hydrogen maleate.

9. A melt processable thermoplastic composition of claim 6 wherein the dynamically crosslinked elastomer contains from about 65-80 weight percent ethylene.

10. A melt processable thermoplastic composition of claim 1 containing an inorganic filler.

11. A melt processable thermoplastic composition of claim 1 containing a hydrocarbon oil.

12. A melt processable thermoplastic composition of claim 1 containing a plasticizer.

13. A melt processable thermoplastic composition comprising a blend of a crystalline polyolefin resin and a dynamically crosslinked elastomer which comprises:
   (A) 20-70 parts by weight of a crystalline polyolefin resin comprising polymerized monomer units of ethylene or propylene or mixtures thereof, and
   (B) 30-80 parts by weight of a crosslinked ethylene-/alkyl acrylate elastomer made from dynamically crosslinking an ethylene/methyl acrylate/monoethyl hydrogen maleate copolymer containing about 65-80 weight percent ethylene, the dynamically crosslinked elastomer being dispersed throughout the crystalline polyolefin resin.

14. A melt processable thermoplastic composition of claim 13 wherein the polyolefin resin comprises polymerized monomer units of propylene.

15. A process for making a melt processable thermoplastic composition comprising a blend of a crystalline polyolefin resin and a dynamically crosslinked elastomer which comprises:
   (1) adding to a mixer
      (A) 15-75 parts by weight of the crystalline polyolefin resin, polyethylene, polypropylene or copolymers thereof,
      (B) 25-85 parts by weight of an uncrosslinked elastomer comprising about 60-90 weight percent ethylene, an alkyl acrylate wherein the alkyl group contains 1-6 carbon atoms and the monoalkyl ester of 1,4-butenedioic acid,
      (C) a crosslinking agent for the ethylene, alkyl acrylate elastomer, and
   (2) mixing and shearing the composition at a temperature sufficient to soften the polyolefin resin and to dynamically crosslink said elastomer resulting in the crosslinked elastomer being dispersed throughout the crystalline polyolefin resin.

16. A process for making a melt processable thermoplastic composition of claim 15 which comprises adding to the mixer an uncrosslinked elastomer comprising about 65-80 weight percent ethylene.

17. A process for making a melt processible thermoplastic composition of claim 15 wherein the cure-site of the uncured elastomer is monoethyl hydrogen maleate.

18. A process for making a melt processible thermoplastic composition of claim 15 which comprises adding to the mixer an uncrosslinked elastomer comprising ethylene, methyl acrylate and monoethyl hydrogen maleate.

19. A process for making a melt processible thermoplastic composition of claim 15 which comprises adding to the mixer the crystalline polyolefin resin polyethylene.

20. A process for making a melt processible thermoplastic composition of claim 15 which comprises adding to the mixer the crystalline polyolefin resin polypropylene.

21. A process for making a melt processible thermoplastic composition of claim 15 which comprises adding to the mixer an inorganic filler.

22. A process for making a melt processible thermoplastic composition of claim 15 which comprises adding to the mixer a hydrocarbon oil.

23. A process for making a melt processible thermoplastic composition of claim 15 which comprises adding to the mixer a plasticizer.

24. A process for making a melt processible thermoplastic composition comprising a blend of a crystalline polyolefin resin and a dynamically crosslinked elastomer which comprises:
 (1) adding to the mixer
  (A) 25-70 parts by weight of the crystalline polyolefin resin polyethylene, or polypropylene, and
  (B) 30-75 parts by weight of an uncrosslinked elastomer comprising about 65-80 weight percent ethylene, methyl acrylate and the monoalkyl ester of 1,4-butenedioic acid wherein the alkyl group contains 1-6 carbon atoms,
  (C) a crosslinking agent for the ethylene, methyl acrylate elastomer, and
 (2) mixing and shearing the composition at a temperature sufficient to soften the polyolefin resin and to dynamically crosslink the elastomer resulting in the crosslinked elastomer being dispersed throughout the crystalline polyolefin resin.

25. A process for making a melt processible thermoplastic composition of claim 24 wherein the polyolefin resin is polypropylene.

26. A process for making a melt processible thermoplastic composition of claim 25 wherein the monoalkyl ester of 1,4-butenedioic acid is monoethyl hydrogen maleate.

* * * * *